UNITED STATES PATENT OFFICE.

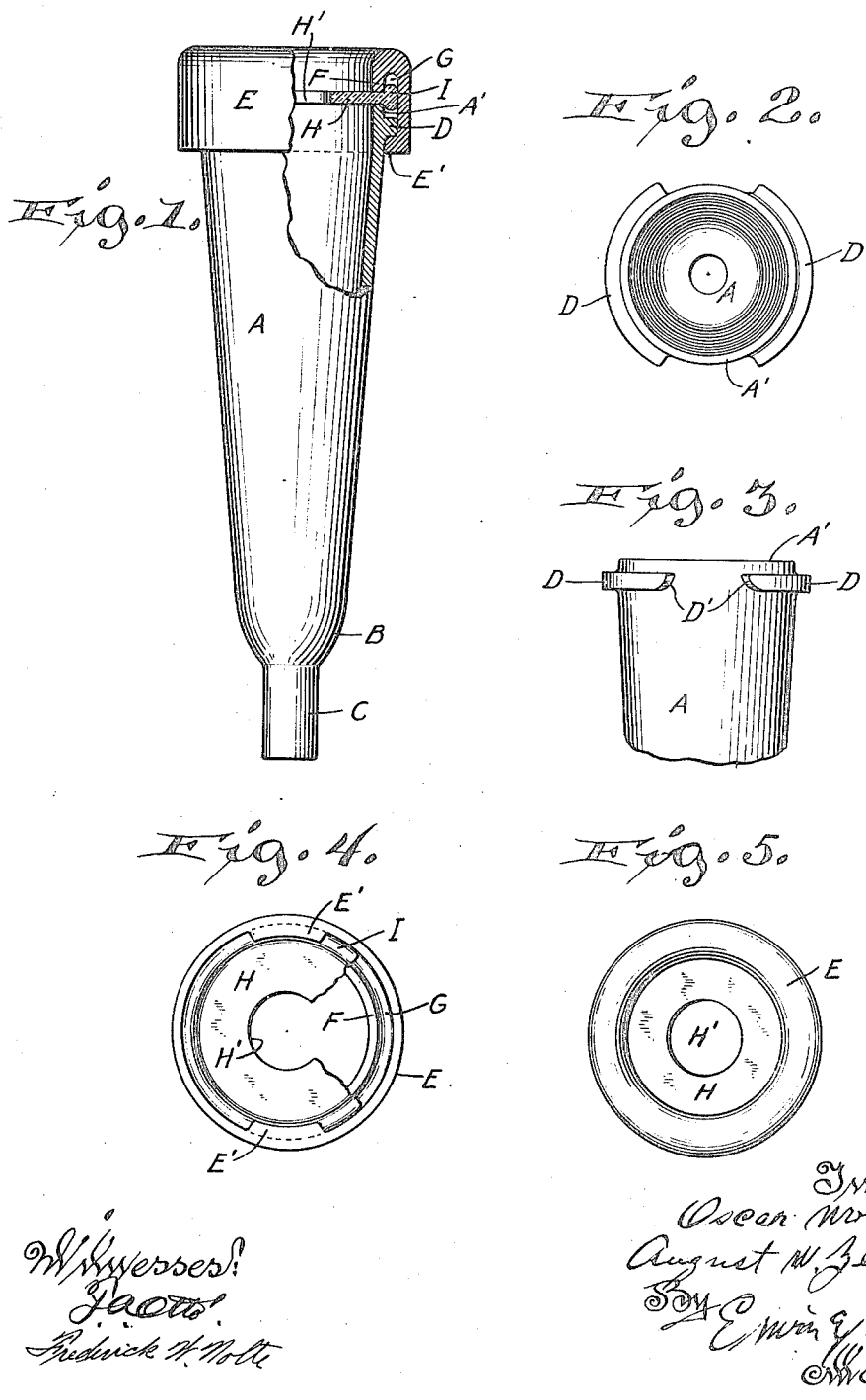

AUGUST W. ZERATSKY AND OSCAR WOSTAL, OF LA CROSSE, WISCONSIN.

TEAT-CUP.

1,269,361.   Specification of Letters Patent.   Patented June 11, 1918.

Application filed September 17, 1917. Serial No. 191,674.

*To all whom it may concern:*

Be it known that we, AUGUST W. ZERATSKY and OSCAR WOSTAL, citizens of the United States, residing at La Crosse, county of La Crosse, and State of Wisconsin, have invented new and useful Improvements in Teat-Cups, of which the following is a specification.

The object of our invention is to provide a form of teat cup, in which the number of parts is reduced to a minimum, and in which the parts are so constructed and associated as to facilitate separating and cleaning them with a minimum loss of time, and with a minimum of difficulty, not only in effecting a separation of the parts, but also in reassembling them in position for use.

A further object of our invention is to provide a teat cup having a metal structure composed of two separable parts, and a teat receiving annulus formed of rubber associated with the metal parts that it may be clamped between the latter in the operation of assembling them,—the rubber annulus serving as a packing between the metal members, and the shape of the parts being such that this packing annulus will invariably form an air tight joint.

We have found, in practical experience, that sanitation in milking apparatus depends largely upon the ease and expedition within which the parts may be separated, cleaned and replaced. In the busy season, which is also the hot season of the year, farmers will not take the time to separate the parts of a milking apparatus and thoroughly cleanse them, unless this operation requires but little more time than that required for washing the apparatus without separating the parts. Therefore, our invention has in view the provision of means whereby a teat cup may be washed even more readily by separating the parts than otherwise, and quickly reassembled with the certainty that the joints will be air tight.

A still more important object of our invention is to provide a teat cup with a disk-shaped teat engaging member or apertured diaphragm composed of elastic material and arranged for edge contact with the teat and at the margin of said aperture, said diaphragm being provided with means whereby it may be securely clamped and positioned upon the upper margin of the cup and held in place under definitely limited pressure by means of a retaining ring or annulus.

In the drawings:—

Figure 1 is a side elevation, part in vertical section, of our improved teat cup.

Fig. 2 is a plan view of the lower member of the cup, with the cap member detached.

Fig. 3 is an elevation of the lower part of the cup.

Fig. 4 is a view of the cap member as seen from the under side, with the diaphragm in place, partly broken away.

Fig. 5 is a top view of the same with the diaphragm or annulus in position.

Like parts are identified by the same reference characters throughout the several views.

The lower member of our improved teat cup comprises a body A composed of metal, reduced at B near its lower end and terminating in a depending nipple or tubular stem C, over which a rubber hose connection may be slipped, whereby the milk may be conveyed from the teat cup to a receiver, or so-called releaser chamber. The body A is preferably in the form of an inverted cone, this being the usual form of modern teat cups.

Near the upper end of the body A, we have provided a pair of outwardly projecting segmental flanges D, oppositely disposed, and having their ends preferably beveled at D', on the under side. The wall of the body A projects above these flanges in the form of a ring or upstanding circular flange A', although constituting merely a continuation of the body wall.

A cap member E is in the form of a sleeve or collar, having a sufficient internal diameter to allow it to slip freely over the upper end of the body A and the segmental flanges D, but having a set of interlocking inturned segmental flanges E' adapted to pass through the spaces between the ends of the segments D, and engaging under the latter by rotation of one member upon the other, the beveled surfaces D' on the segments D facilitating the passage of the flanges E' underneath the segments D when one of the members is rotatably adjusted upon the other.

The upper marginal portion of the cap member is turned inwardly and downwardly along curved lines, and the downwardly turned edge F is so disposed as to be directly above the upper edge of the part A' of the body portion of the cup. When the cap member is in assembled position between this inwardly and downwardly turned marginal portion and the outer wall of the cap, there is an annular channel G to receive the margin of the rubber annulus, or teat engaging apertured diaphragm H. This rubber annulus H is provided with a central aperture H' to receive the teat. It is a little larger in diameter than the upper end A' of the body A, and the margin of the rubber annulus which projects beyond the wall A' of the body is thickened to form a rim, I, the lower portion of which is adapted to lap over the body portion A', and the upper portion of which is adapted to engage in the cap member channel G.

The vertical dimensions of the cap member E are such that when its inturned flanges E' are engaged underneath the segments D the rubber annulus will be under compression between opposing margins of the part A' of the body and the portion F of the cap member. It is therefore necessary to press the members A and E forcibly together, in order to rotate one upon the other, in such a manner as to engage the flanges E' underneath the segments D. The resiliency of the rubber not only adapts it to serve as a packing interposed between the edges of the parts A' and F, but it also facilitates holding the parts in assembled relation by maintaining the flanges E' in binding pressure engagement upon the under surfaces of the segments D. But, by applying pressure to force the two metal members toward each other the rubber may be additionally compressed sufficiently to allow said members to be easily rotated to a position where the flanges E' may pass between the ends of the segments D, thus effecting an almost instant separation of the parts. When the cap member has been removed the rubber annulus may also be instantly removed from the cap by inserting a finger through the central aperture and drawing the annulus out through the bottom of the cap. The annulus is sufficiently flexible so that it will readily pass the flanges E'.

By making the metal parts of non-corrosive material, such as aluminum or aluminum alloy, or by coating the metal parts with non-corrosive material, it is possible to manipulate them into and out of engagement with uniform ease and with practically no loss of time. When these parts are separated and the rubber annulus removed from the cap member all surfaces will be fully exposed to the action of a cleansing fluid. The teat cup may be washed even more quickly than would be the case if it were attempted to wash it without separating the parts. It will be observed that the segments D and inturned flanges E' are annular in form, and that there is no increase in pressure upon the rubber annulus after the flanges have moved into their locking engagement with the segments. We attach considerable importance to this feature of our invention, for while it is possible to connect the cap member with the body member by means of a screw or a set of screw segments, it is possible in such cases for muscular persons to turn the cap on so tightly that it cannot be removed by others who have less strength. When screw threads are employed, it is also possible for a muscular person to screw a cap member onto the body member with such force as to seriously injure or destroy the teat engaging annulus or diaphragm by cutting it in two. But our invention provides means for positively limiting the degree of pressure upon the rubber annulus, and also requiring that such degree of pressure be attained before the parts can be securely held together, thus insuring an air tight joint, with uniform pressure upon the annulus.

It is an important feature of our invention that the diaphragm may be clamped in position without flexion or distention. Numerous attempts have been made to provide teat cups having rubber mebranes which may be stretched over certain metal parts of the cup and having inturned portions adapted to embrace the teat, but such membranes quickly deteriorate on account of the stretching to which they are subjected, and they are also difficult to remove for the purpose of cleansing them, and also cleansing the surfaces to which they are applied. By employing a simple disk shaped rubber diaphragm, thickened near or at its outer margin, the amount of rubber is reduced to a minimum, the durability of the diaphragm is increased, and, when used in connection with the clamping member herein described, the parts may be instantly separated, cleansed, and replaced. New diaphragms can also be substituted for damaged ones with a minimum of expense.

We claim:

1. The combination with the body portion of a teat cup, provided with outwardly projecting segmental flanges near its upper end, of an annular flanged cap member, adapted to fit over the body member with its flanges engaging underneath the body member flanges, and a non-metallic annulus composed of resilient material centrally apertured to receive a teat, and interposed between the upper margin of the cap member and body member respectively, the upper margin of the cap member being inwardly and downwardly turned and adapted to bear upon said annulus above the upper margin of the body member.

2. The combination with the body portion of a teat cup, provided with outwardly projecting segmental flanges near its upper end, of an annular flanged cap member adapted to fit over the body member, with its flanges engaging underneath the body member flanges, and a non-metallic annulus composed of resilient material centrally apertured to receive a teat, and interposed between the upper margin of the cap member and body member respectively, the upper margin of the cap member being inwardly and downwardly turned and adapted to bear upon said annulus above the upper margin of the body member, the ends of the body member flanges being beveled on the under side.

3. The combination with the body portion of a teat cup, provided with outwardly projecting segmental flanges near its upper end, of an annular cap member adapted to fit over the body member, and having projections adapted to be manipulated underneath the body member flanges, and a non-metallic annulus composed of resilient material centrally apertured to receive a teat, and interposed between the upper margin of the cap member and body member respectively, the upper margin of the cap member being inwardly and downwardly turned and adapted to bear upon said annulus above the upper margin of the body member, said non-metallic annulus having a thickened rim portion adapted to lap over the upper end of the body member, and around the down-turned marginal portion of the cap member.

4. The combination with the body portion of a teat cup, provided with outwardly projecting segmental flanges near its upper end, of an annular cap member provided with inturned flanges, and adapted to fit over the body member, with said flanges engaging underneath the body member flanges, and a non-metallic annulus composed of resilient material centrally apertured to receive a teat, and interposed between the upper margin of the cap member and body member respectively, the upper margin of the cap member being inwardly and downwardly turned, and adapted to bear upon said annulus above the upper margin of the body member, said non-metallic annulus being of such thickness and resiliency to maintain the interlocking portions of the body member and the annulus in forcible pressure engagement.

5. The combination with a teat cup body member, an annular teat engaging annulus seated upon the upper margin of the body member, an annular cap member seated upon said resilient annulus, and adapted, when forcibly pressed upon the annulus and partially rotated, to move into or out of interlocking engagement with the body member without increase of pressure upon the annulus after said engagement is effected.

6. The combination with the body portion of a teat cup, of a capping annulus and an interposed non-metallic teat engaging annulus composed of compressible material, means for binding the capping annulus upon the teat engaging annulus, and connecting the same with the body portion of the cup in such binding relation, said connecting means being adapted to maintain uniform pressure of the capping annulus upon the teat engaging annulus under all connecting conditions.

7. In a teat cup, an apertured teat receiving rubber diaphragm having its outer margin thickened and constituting a rim adapted to facilitate centering and retaining the diaphragm in position.

8. In a teat cup, an apertured diaphragm composed of elastic material having a peripherally thickened rim portion to facilitate centering and retaining the diaphragm in proper relation to the other parts of the cup.

9. In a teat cup, an apertured diaphragm composed of elastic material having a peripherally thickened rim portion to facilitate centering and retaining the diaphragm in proper relation to the other parts of the cup, in combination with a cup body adapted to engage the under surface of the diaphragm within the thickened marginal portion thereof, and a retaining ring provided with a channel adapted to receive said thickened portion of the diaphragm and having an annulus in position to bear upon the upper portion of the diaphragm within said rim portion.

10. In a teat cup, an apertured diaphragm composed of elastic material having a peripherally thickened rim portion to facilitate centering and retaining the diaphragm in proper relation to the other parts of the cup, in combination with a cup body adapted to engage the under surface of the diaphragm within the thickened marginal portion thereof, and a retaining ring provided with a channel adapted to receive said thickened portion of the diaphragm and having an annulus in position to bear upon the upper portion of the diaphragm within said rim portion, and means for applying definite clamping pressure to the annular portion of the diaphragm immediately encircled by said rim.

11. In a teat cup, the combination of a disk shaped apertured diaphragm composed of elastic material, a cup body having an upper margin adapted to receive said diaphragm, and an annular clamping member adapted to removably engage the cup body and having one annular wall projecting downwardly into clamping engagement with the upper surface of said diaphragm opposite the margin of the cup body, whereby the diaphragm may be clamped in position without flexion, said diaphragm, when clamped upon the body, being secured thereto without distortion or stretching of the material, and having its outer margin in substantially the same plane with its margin at the central aperture.

In testimony whereof we affix our signatures in the presence of two witnesses.

AUGUST W. ZERATSKY.
OSCAR WOSTAL.

Witnesses:
H. E. HAUSER,
A. J. MOCKLEY.